Patented Apr. 14, 1936

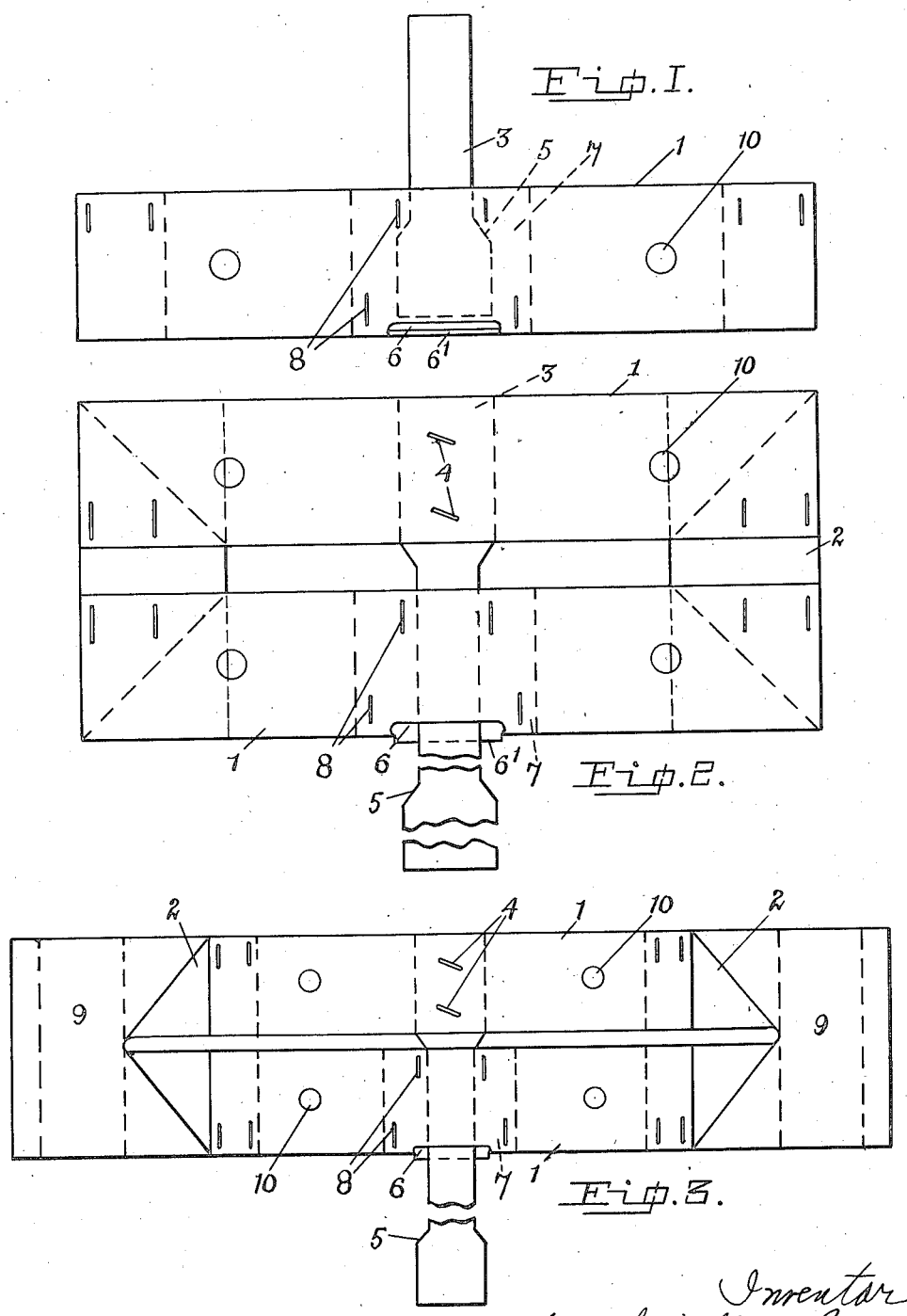

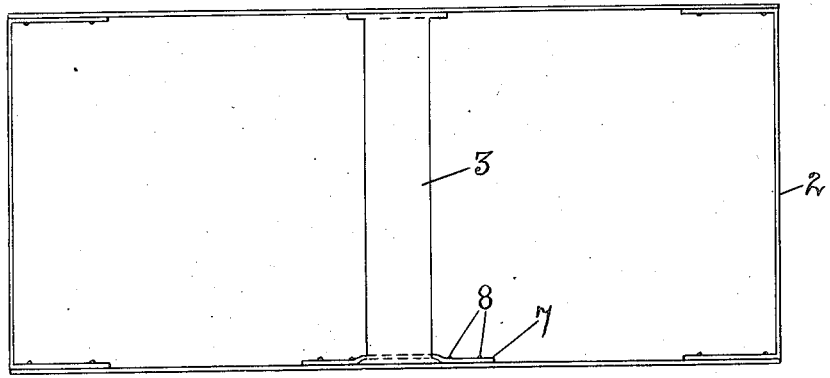
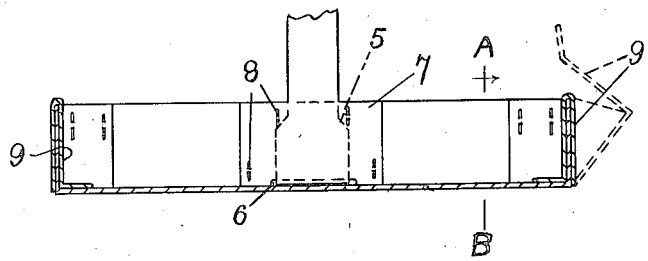
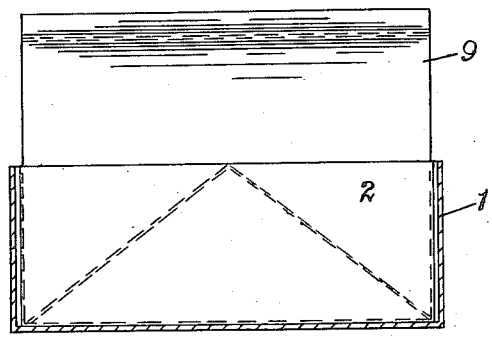

2,036,995

UNITED STATES PATENT OFFICE 2,036,995

COLLAPSING BASKET FOR FRUIT OR OTHER FRAGILE ARTICLES

Frank William Bennett, Enfield, England

Application February 25, 1935, Serial No. 8,134
In Great Britain September 10, 1934

4 Claims. (Cl. 229—52)

This invention refers to improvements in and relating to collapsing baskets for fruit or other fragile articles.

According to this invention, the basket is made with folding-down sides and with scored ends which fold inwards or outwards with the sides. To one of the sides a handle of some suitable pliable material is secured which in the folded-down position is passed through a slot formed near the bottom of the opposite side.

The slot is cut centrally and slightly above the bottom fold or crease, leaving a lip at the lower edge of the slot and the free end of the handle is shouldered and adapted, when the basket is opened out, to engage in a pocket formed by the adjacent side of the basket and an additional piece secured on the inside thereof. The handle is prevented from pushing back through the slot by the lip at the lower edge of the slot.

If desired the basket may be made with a lid or cover. In this case a slot is made in the lid or cover to accommodate the handle.

The invention is illustrated in the accompanying drawings, in which:—

Fig. 1 is a side view of a basket in the opened position;

Fig. 2 is a plan view of a basket in the folded-down position;

Fig. 3 is a similar view of a modification.

Fig. 4 is a plan view of the structure shown in Fig. 1.

Fig. 5 is a central longitudinal section of the basket of Fig. 3, the parts being shown in the operative position in full lines and one reinforcement being shown unfolded in dotted lines.

Fig. 6 is a cross-section on the line A—B of Fig. 5.

As shown the basket is formed with sides 1, 1 and ends 2, 2, creased and scored so as to be collapsible on to the bottom and adapted to be opened out by pulling up the sides.

To one of the sides 1 is secured a handle 3 by staples 4 or other means. The free end of the handle 3 is shouldered at 5 and passes through a slot 6 formed near the bottom of the side 1 opposite to that to which the handle 3 is secured. In the collapsed position shown in Figs. 2 and 3, the handle 3, which is preferably of thin wood, will lie substantially flat. When the basket is opened the free end of the handle 3 slides upwards into the pocket formed by the adjacent side 1 and the additional strip 7 secured on its inside by means of the staples 8. The uppermost staples 8 are placed so that the shouldered portion 5 of the handle 3 abuts against them and prevents the handle being pulled right through. The handle 3 is prevented from being pushed back through the slot 6 by the lip $6^1$ at the bottom edge thereof.

In the form shown in Fig. 2, the ends 2, 2 fold inwardly when collapsed, whilst in Fig. 3 they are shown as folding outwardly.

In Fig. 3 the ends 2, 2 are shown provided with reinforcements 9, 9, which, when the basket is opened, are simply folded over the ends in order to make them more rigid.

Apertures 10 may be provided to allow of efficient ventilation of the contents of the basket.

I claim:

1. A collapsible basket comprising a bottom and folding-down sides and ends, one of said sides being slotted, a pliable handle secured at one end to one of said sides, the free end of said handle passing through the opposite slotted side, and means on said slotted side cooperating with the free end of said handle to retain the handle, after its free end has been pulled in through the slot, against being disconnected from said slotted side, the arrangement being such that when the basket is collapsed the handle will lie substantially flat, and when the basket is opened out the handle will be pulled up into proper position for holding.

2. A collapsible basket comprising a bottom and folding-down sides and ends, one of said sides being slotted, a pliable handle secured at one end to one of said sides, the free end of said handle passing through the opposite slotted side, a shouldered portion on said free end, an additional strip on the inner side of said slotted side, staples securing said additional strip to the said slotted side in such manner as to form a pocket, the arrangement being such that, in the opened position, the said shouldered portion slides into said pocket and abuts against the uppermost of said staples and prevents the handle being pulled right through said slotted side.

3. A collapsible basket comprising a bottom and folding-down sides and ends, one of said sides being slotted, a pliable handle secured at one end to one of said sides, the free end of said handle passing through the opposite slotted side, a lip at the lower edge of said slot, a shouldered portion on said free end, an additional strip on the inner side of said slotted side, staples securing said additional strip to the said slotted side in such manner as to form a pocket, the arrangement being such that, in the opened position, the said shouldered portion slides into said pocket and abuts against the uppermost of said staples and prevents the handle being pulled right through said slotted side, whilst the said lip prevents the handle pushing back through said slotted side.

4. A collapsible basket comprising a bottom and folding-down sides and ends, one of said sides being slotted, a pliable handle secured at one end to one of said sides, the free end of said handle passing through the opposite slotted side, means on said free end to prevent the handle from being pulled right through said slotted side, reinforcements adjacent the ends of the basket adapted, when the basket is opened, to fold over and reinforce said ends, the arrangement being such that said reinforcements fold flat when the basket is collapsed.

FRANK WILLIAM BENNETT.